3,151,011
PROCESS FOR MAKING RIBBONS
Adriaan Johan Troeleman, Narrows, and Carl Robert Delagrange, Ripplemead, Va., assignors to Celanese Corporation of America, New York, N.Y., a corporation of Delaware
Filed Dec. 5, 1960, Ser. No. 73,892
9 Claims. (Cl. 156—180)

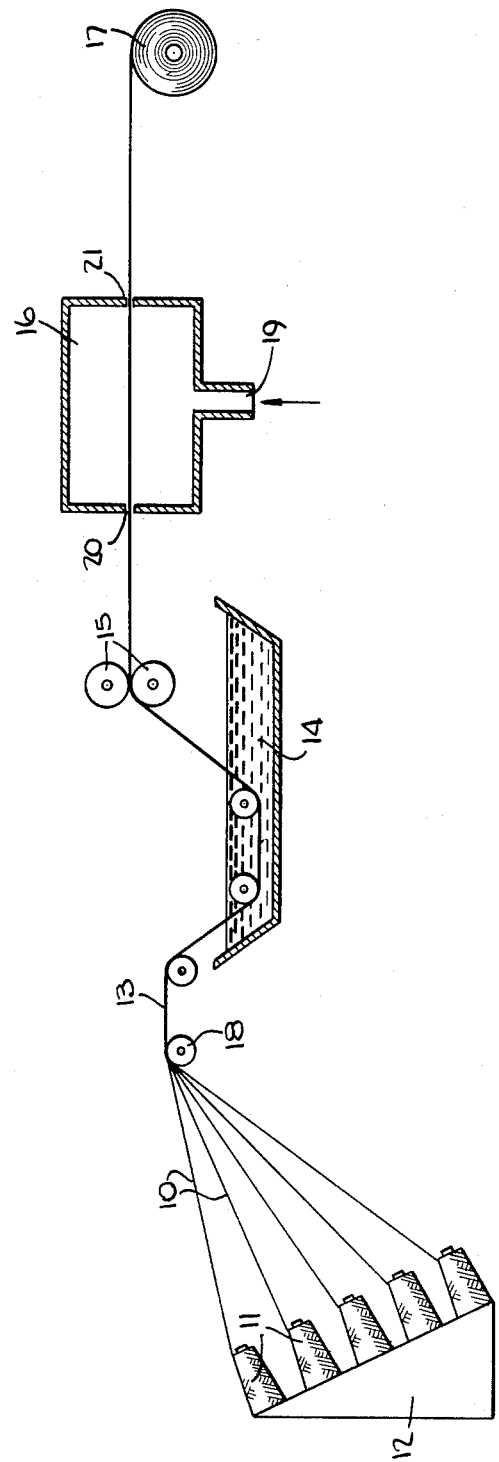

This invention relates to weftless fabrics and in particular to a process for making weftless ribbons.

It is an object of this invention to provide a process for the making of weftless ribbons which is more efficient than existing processes.

It is another object of this invention to provide a process for the making of weftless ribbons which eliminates the cumbersome drying apparatus used in existing processes.

It is yet another object of this invention to provide improved ribbon drying in a process for the making of weftless ribbons.

It is a further object of this invention to provide a process for the making of weftless ribbons of improved hand and bonding.

Other objects and advantages will become apparent from the following detailed disclosure and claims in which all proportions are by weight unless otherwise stated.

According to one aspect of the present invention, weftless ribbons are made by bonding together the yarns of a warp consisting of parallel yarns comprising a plasticizable thermoplastic fiber material to form a self supporting warp by applying plasticizer to said warp and then applying steam to said plasticizer-containing warp.

The thermoplastic fiber may be composed of a variety of materials including polyamides such as nylon, linear polyesters such as polyethylene terephthalate, polymers and copolymers of vinylidene compounds such as acrylonitrile, vinyl acetate, vinyl chloride, vinylidene chloride, vinylidene cyanide, and ethylene, propylene, etc. Especially good results may be achieved with organic acid esters of cellulose such as cellulose acetate, cellulose propionate, cellulose butyrate, cellulose acetate formate, cellulose acetate propionate, cellulose acetate butyrate and the like. Of these, cellulose acetate is preferred, particularly acetone-soluble secondary cellulose acetate of acetyl value of about 50 to 58 and most preferably 54 to 56 calculated as combined acetic acid.

The composition of the plastizer will vary with the nature of thermoplastic fiber. For organic acid esters of cellulose, the plasticizer may be tris(chloroethyl) phosphate, acetyl triethyl citrate, glycerine diacetate, glycerine triacetate, dimethyl phthalate, triethyl citrate, dimethoxyethyl phthalate, methyl phthalyl ethyl glycollate, monotrichloroethyl phosphate, triphenyl phosphate or the like.

Preferably, the plasticizer is applied to the inert yarns by a coating technique, e.g., by an immersion, dipping or spraying operation, or by the yarn being passed over one or more kiss rollers. It is then preferable to remove excess plasticizer composition. This may be readily accomplished by passing the warp between a pair of squeeze rollers or by any other conventional method such as a wiping operation.

The plasticizer composition may also comprise a solvent for the thermoplastic material. The solvent should preferably be diluted with non-solvents such as water or alcohol in order to prevent the solvent from effecting any appreciable dissolution of the treated yarns. It is preferable to employ a solvent which is volatile so that upon evaporation of the solvent, the bond between the yarns will be stronger. For cellulose esters, such solvents include acetone, methylene chloride or the like.

The amount of plasticizer carried by the warp will depend on the spacing and relative weight of the thermoplastic yarns as well as upon the activity of the particular plasticizer and its concentration.

Steam is then applied to the plasticizer containing warp. The steam may be conveniently applied in a steam chamber through which the plasticizer containing warp is passed. The warp is subjected to steam having a temperature of from 190 to 280°, most preferably from 250 to 280°. The warp remains preferably in contact with the steam for a time in the order of from 0.1 to 1 second.

The foregoing and other objects, characteristics and advantages of the present invention will be more fully understood from the following detailed description thereof when read in connection with the accompanying drawing which is a diagrammatic illustration of an arrangement for forming weftless ribbons.

The individual yarns 10 are drawn from bobbins 11 on creel 12 and are aligned in parallel adjacent relation by aligning means 18 to form warp 13. Where 10 or less yarns are being aligned, the aligning means are preferably a pigtail guide, although other means such as an eyelet board or comb may be used and are preferred where greater numbers of yarn ends are being aligned. Warp 13 is then passed through reservoir 14 containing plasticizer composition and then between squeeze rollers 15 wherein excess plasticizer composition is removed and drips back into reservoir 14. The warp next passes through steam chamber 16 entering through aperture 20 and leaving through aperture 21. Steam is continuously driven through conduit 19 into the chamber and leaves the chamber through apertures 20 and 21. After passing through the steam chamber, the ribbon is wound on take-up spindle 17.

The invention is further illustrated in the following example.

*Example*

Individual yarns of secondary cellulose acetate having an acetyl value of 55, a denier of 100, about 0 to 0.3 turn per inch and having about 26 filaments per yarn were drawn from a series of bobbins and aligned by a yarn guide to form a warp 1.4 mm. wide, one yarn in thickness, composed of 10 ends of yarn aligned in parallel adjacent relationship. The warp was then passed through a reservoir containing a composition comprising 43 parts of acetone, 50 parts water, 1 part tricresyl phosphate and 6 parts tris(B-chloroethyl) phosphate maintained at 21° C. The pressure of the steam supply was about 30 p.s.i.g. but the pressure in the steam chamber was about atmospheric pressure. The warp remained immersed in the composition for about 0.2 second. The warp was then passed through a pair of squeeze rollers which removed excess plasticizer composition from the warp, after which the warp was passed through a steam chamber for a period of 0.2 second. In this chamber steam having a temperature of 194° F. was applied to the warp.

It is to be understood that the foregoing detailed description is given merely by way of illustration and that many variations may be made therein without departing from the spirit of our invention.

Having described our invention what we desire to secure by Letters Patent is:

1. Process for producing a ribbon which comprises bonding together the yarns of a warp comprising parallel yarns comprising a plasticizable thermoplastic polymeric fiber material to form a self supporting warp by applying an equeous liquid plasticizer to said warp, then applying steam to said warp and directly thereafter collecting said warp as a roll of ribbon.

2. The process defined in claim 1 wherein said fiber material is cellulose acetate.

3. A continuous process for producing a ribbon by bonding together the yarns of a warp which comprises continuously aligning a plurality of continuous plasticizable thermoplastic polymeric yarns into warp of parallel yarns, continuously and sequentially passing said warp through a zone where an aqueous liquid plasticizer is applied to said warp, then through a zone where steam is applied to said warp and directly thereafter collecting said warp as a roll of ribbon.

4. The process defined in claim 2 wherein the plasticizer applied to said warp comprises tris(chloroethyl) phosphate and aqueous acetone.

5. The process defined in claim 3 wherein said steam is applied by continuously passing said warp through an enclosed steam chamber having an opening for the entrance and an opening for the exit of said warp and an opening for the passage of steam into the chamber, said steam diffusing through said chamber and leaving said chamber through said openings for the entrance and exist of said warp.

6. A process for producing a weftless ribbon which comprises the steps of:
   (a) providing a warp of parallel cellulose ester yarns;
   (b) applying an aqueous liquid plasticizer to said warp; and
   (c) applying steam to said warp subsequent to said plasticizer application, whereby said yarns are bonded together and directly thereafter collecting said warp as a roll of ribbon.

7. A process in accordance with claim 6 wherein said steps are conducted continuously and sequentially.

8. A process for producing a weftless ribbon which comprises the steps of:
   (a) providing a warp of parallel cellulose ester yarns;
   (b) applying a solution of tris(chloroethyl) phosphate in aqueous acetone to said warp; and
   (c) applying steam at a temperature from about 190° F. to 280° F. to said warp for a period of from 0.1 to 1 second, whereby said yarns are bonded together and directly thereafter collecting said warp as a roll of ribbon.

9. A process in accordance with claim 8 wherein said cellulose ester is acetone-soluble secondary cellulose acetate.

References Cited in the file of this patent

UNITED STATES PATENTS

| | | |
|---|---|---|
| 2,792,325 | Downing | May 14, 1957 |
| 2,794,480 | Crawford et al. | June 4, 1957 |
| 3,079,930 | Cobb et al. | Mar. 5, 1963 |

OTHER REFERENCES

Buttrey: "Plasticizers," Cleaver-Hume Press Ltd., London, 2nd edition, 1957, pp. 28 and 29.